(12) United States Patent
Oldman

(10) Patent No.: US 6,769,115 B1
(45) Date of Patent: Jul. 27, 2004

(54) ADAPTIVE INTERFACE FOR A SOFTWARE DEVELOPMENT ENVIRONMENT

(75) Inventor: Daniel E. Oldman, Durham, NC (US)

(73) Assignee: EMC Corporation, Hopkinton, MA (US)

( * ) Notice: Subject to any disclaimer, the term of this patent is extended or adjusted under 35 U.S.C. 154(b) by 621 days.

(21) Appl. No.: 09/672,739

(22) Filed: Sep. 28, 2000

Related U.S. Application Data

(60) Provisional application No. 60/201,051, filed on May 1, 2000.

(51) Int. Cl.$^7$ ................................................ G06F 9/44
(52) U.S. Cl. ..................................... 717/126; 717/121
(58) Field of Search ................................ 717/101–103, 717/120–127, 131, 140, 141, 147, 162–164

(56) References Cited

U.S. PATENT DOCUMENTS

| | | | | |
|---|---|---|---|---|
| 5,293,629 A | * | 3/1994 | Conley et al. ............... | 717/154 |
| 5,583,988 A | * | 12/1996 | Crank et al. .................. | 714/48 |
| 5,774,728 A | * | 6/1998 | Breslau et al. ............... | 717/141 |
| 5,907,709 A | * | 5/1999 | Cantey et al. ............... | 717/141 |
| 6,182,281 B1 | * | 1/2001 | Nackman et al. ........... | 717/116 |
| 6,330,518 B1 | * | 12/2001 | Colson ........................ | 702/123 |
| 6,356,957 B2 | * | 3/2002 | Sanchez et al. ............. | 709/328 |
| 6,370,682 B1 | * | 4/2002 | Eckardt et al. ............. | 717/141 |
| 6,487,713 B1 | * | 11/2002 | Cohen et al. ................ | 717/105 |
| 6,526,570 B1 | * | 2/2003 | Click et al. .................. | 717/146 |

OTHER PUBLICATIONS

Derek Jones, "The Open Systems (Source) Portability Checker," [online] 1995 [accessed Jul. 24, 2003], Retrieved from Internet <URL: http://www.knosof.co.uk/ospc.html>, pp. 1–6.*

"IEEE Standard Computer Dictionary: A Compilation of IEEE Standard Computer Glossaries," 1990, The Institute of Electrical and Electronic Engineers, pp. i, 111.*

Derek Jones, "Applications POSIX. 1 Conformance Testing," [online] 1995 [accessed Feb. 5, 2004], Knowledge Software, Ltd., Retrieved from Internet <URL: http://www.knosof.co.uk/poschk.html>, pp. 1–8.*

"OSPC—A Standards Enforcement Toolset for C." [online] archived 1997 [accessed Feb. 5, 2004], Knowledge Software, Ltd., Retrieved from Internet <URL: http://web.archive.org/web/19970412042551/http://www.knosof.co.uk/sales.html>, pp. 1–2.*

* cited by examiner

*Primary Examiner*—Tuan Dam
*Assistant Examiner*—Eric B. Kiss
(74) *Attorney, Agent, or Firm*—Gordon E. Nelson

(57) ABSTRACT

A software development environment that permits early detection of problems that arise in porting a program to a number of different platforms. In the environment, the source code for the program to be ported is compiled together with a set of header files or other database that describes the different platforms. The compiler emits a list of porting problems that the program source code has with respect to the platforms. Also included in the environment are run-time binary code that detects porting problems for the different platforms at run time and a library of run-time routines that deal with particular porting problems. The header files, the run-time binary code for the platform, and the run-time routines are generated by a meta-compiler from a description of the differences between the platforms written in the AdI language. Also generated is platform proof source code which tests whether the description of a platform in the AdI language is correct.

3 Claims, 23 Drawing Sheets

401

Source: module1.m

```
(header "t1.h"
    (function fun1 long (( x int ))))
```

Generated header: include/t1.h 403

```
#ifndef _AdI_t1__h          405
define _AdI_t1__h include <_AdI_global.h>    407 if !_AdI_ASM_LABEL_ENABLED
define fun1 _AdI_fun1                  409
#endif
```
411     `_AdI_EXTERN long fun1 (int )`
412     `_AdI_ASM_LABEL("_AdI_fun1");`

```
#endif /* ndef _AdI_t1__h */
```

Generated linktime source 413

```
/* Module t1.m */
include "_AdI_impl.h"
#include "_AdI_runtime_tools.h"

_AdI_stub_function(_AdI_fun1);     415

/* End of t1.m */
```

Generated runtime source 417

```
/* Module t1.m */ include "_AdI_impl.h"
include "_AdI_runtime_tools.h"       418
#include "include/t1.h"   419

_AdI_jumpfcn( _AdI_fun1, fun1 );    420

/* End of t1.m */
```

Generated Platform Proof source file: pproof/t1.c

```
#include <t1.h>         503
#include "_AdI_prove_tools.h"

char *_AdI_test_name = "t1";

int _AdI_prove()
{
   int _AdI_test_count = 0;  506
 { /* function fun1 */
   { long (* _AdI_x) (int ) = &fun1;  507
     _AdI_x=0;  509
                            508
   }
   _AdI_test_count++;  510
 }
# if (os == tos1)                     517      519
    if( _AdI_test_count != 1 )
      _AdI_error( "Test count not 1: %d", _AdI_test_count );    515
# define _AdI_count_tested
# endif                         521
# if (os == tos2)
    if( _AdI_test_count != 1 )
      _AdI_error( "Test count not 1: %d", _AdI_test_count );
# define _AdI_count_tested
# endif                                                                  513
# if (os == tos4)
    if( _AdI_test_count != 1 )
      _AdI_error( "Test count not 1: %d", _AdI_test_count );
# define _AdI_count_tested
# endif
# ifndef _AdI_count_tested
#  error Test count not checked!        523
# endif
   return _AdI_error_count;
}
```

Modified source: module1.m
603

```
(header "t1.h"
  [(tos2 (function fun1 int (( x int ))))]
)
                605
```

607

Generated header: include/t1.h

```
#ifndef _AdI_t1__h
define _AdI_t1__h include <_AdI_global.h>             609
if _AdI_targ1_INTEREST                      611
#  if _AdI__compiler_integrated
    _AdI__function_missing( fun1, int, (int), "targ1" );       608
#  else
#   define fun1 AdI_ERROR__fun1_is_not_defined_on_targ1
#  endif                                  613
#else
#  if !_AdI_ASM_LABEL_ENABLED
#   define fun1 _AdI_fun1
#  endif
    _AdI_EXTERN int fun1 (int )
       _AdI_ASM_LABEL("_AdI_fun1");
#  endif
#endif /* ndef _AdI_t1__h */
```

FIG. 6

Example user source:

```
#include <stdio.h>
#include <t1.h>
int main()
{ printf( "fun1 of 3 is: %d\n", fun1(3) );
  return 0;
}
```
701

702

Example compilation with no compiler integration:

```
> gcc -c testfun1.c
> gcc -o test testfun.o
testfun1.o: In function `main':
testfun1.o(.text+0x6): undefined reference to
`AdI_ERROR__fun1_is_not_defined_on_targ1'
collect2: linker returned 1 exit status
>
```
705
707
709
703

Example compilation with compiler integration:

```
>gcc -c testfun1.c
testfun1.c:4: AdI error: fun1 is not defined on target
targ1.
>
```
711
713

FIG. 7

| | |
|---|---|
| *forms:* | *form forms$_{opt}$* |
| *form:* | *( form-parts$_{opt}$ )* |
| *form-parts:* | *form-part form-parts$_{opt}$* |
| *form-part:* | *name* |
| | *integer* |
| | *string* |
| | *form* |
| | *insert* |
| | *comment* |
| *name:* | A C-language identifier. Names are case-sensitive. |
| *integer:* | An optional "-" followed by a C-language integer. (e.g. `3`, `0x7777`, `-3`, `-0x1234LL` ) |
| *string:* | *C-string* |
| | *brace-quote* |
| | *cat-quote* |
| | *name* |
| | *integer* |
| *C-string:* | A C-language string. (e.g. `"abc\n"` ) |
| *brace-quote:* | A properly nested set of "`{`}" characters with any other C-language tokens contained. Whitespace is preserved inside except that leading whitespace terminated by a "`.`" is removed from each line of the quote. |
| *cat-quote:* | ( `cat-` *strings$_{opt}$* ) |
| *strings:* | *string strings$_{opt}$* |
| *insert:* | ( `insert-` *string* ) |
| *comment:* | ( `!` *form-parts* ) |

| | |
|---|---|
| *selector:* | [ *selector-choices* ] |
| *selector-choices:* | *selector-choice selector-choices$_{opt}$* |
| | ( else *forms$_{opt}$* ) |
| *selector-choice:* | ( *selection forms$_{opt}$* ) |
| *selection:* | *selection-predicate* |
| *selection-predicate:* | *selector-name* |
| | *sel-log-expr* |
| | *sel-rel-expr* |
| *sel-log-expr:* | ( *sel-lop$_{opt}$ selection-predicates* ) |
| | ( not selection-predicate ) |
| sel-lop: | and |
| | or |
| sel-rel-expr: | ( sel-rop selector-name ) |
| sel-rop: | < |
| | <= |
| | = |
| *selection-predicates:* | *selection-predicate selection-predicates$_{opt}$* |

*system-file:*          *sys-file-forms*

*sys-file-forms:*       *sys-file-form sys-file-forms$_{opt}$*

*sys-file-form:*        *selection-set-def*

*platform-def*

*doc-prop*

*literal*

*macro*

| | |
|---|---|
| *selection-set-def:* | [ ( selection-set *selection-set-def-parts* ) ] |
| *selection-set-def-parts:* | *selector-name description$_{opt}$ sub-selectors$_{opt}$* |
| *selector-name:* | *name* |
| *description:* | *string* |
| *sub-selectors:* | *sub-selector sub-selectors$_{opt}$* |
| *sub-selector:* | ( *selection-set-def-parts* ) |

1401

```
(selection-set unix "Unix Operating Systems"   1409
      (linux  "Linus' Unix"       1413
        (bobx  "Bob's Linux")  1415
        (janex "Jane's Linux")                    1411
        (joex  "Joe's Linux"))
      (solaris  "Sun's Unix"
        (solaris2_6 "Sun's Unix Version 2.6")
        (solaris2_7 "Sun's Unix Version 2.7"))
      (unixware "SCO's Unix"))
```

| | |
|---|---|
| *platform-feature-set-prop:* | ( feature-set feature-definitions ) |
| *feature-definitions:* | feature-definition feature-definitions$_{opt}$ |
| *feature-definition:* | ( selector-name predicate-prologue ) |
| *predicate-prologue:* | name |
| | c-predicate c-prologue |
| *c-predicate:* | string |
| *c-prologue:* | string |

1501

```
(selection-set bsd-signals
   "Berkley Signals behavior control"
  (bsd-signals-off "System V Signals Behavior")      1507a
  (bsd-signals-on "Berkley Signals behavior"))

(selection-set large-files
   "Controls the size of off_t on 32-bit architectures"
  (large-files-off "Using a 32-bit off_t")           1507b
  (large-files-on  "Using a 64-bit off_t"))

(platform dgux-ia32
  "Data General's Unix on the IA-32 Architecture"

(feature-set
    (bsd-signals-off {!BSD_SIGNAL_FLAVOR} {}) ;default   1511a
    (bsd-signals-on  BSD_SIGNAL_FLAVOR))
  (feature-set                                                     1509
    (large-files-off { !defined(_FILE_OFFSET_BITS) ||\
                      (_FILE_OFFSET_BITS == 32) }
                     {#undef _FILE_OFFSET_BITS} )      1511b
    (large-files-on  { _FILE_OFFSET_BITS == 64 }
                     {#define _FILE_OFFSET_BITS 64}))
  ..)
```

```
(selection-set wchar_size "Feature to control wchar_t"
    (wchar32 "The default - 32-bit wchar_t")              } 1603
    (wchar16 "An optional 16-bit wchar_t"))

(selection-set large_files "Support for >2 GB files"
    (off32 "The default - 32-bit off_t")                  } 1605
    (off64 "Large files - 64-bit off_t"))
...
(header "sys/types.h"
    ...
    (typedef wchar_t [(wchar32 {unsigned int})
                      (wchar16 {unsigned short})])        } 1607

(typedef off_t [(off32 {long})
                    (off64 {long long})])                 } 1609
...
(header "unistd+.h"
    (include "sys__types.m")
    ...
    (function pwrite_wchar int ((filedes int)
                                (char wchar_t)       } 1611  } 1610
                                (offset off_t)))
...)
```

| | | |
|---|---|---|
| *sel-factors-expr:* | ( factors *predicate isel-groups* ) | 1701 |
| *isel-groups:* | *isel-group isel-groups$_{opt}$* | 1702 |
| *isel-group:* | *( sel-name-sets )* | |
| *sel-name-sets:* | sel-name-set sel-name-sets$_{opt}$ | |
| *sel-name-set:* | *( selector-names )* | |
| *selector-names:* | *selector-name selector-names$_{opt}$* | |

```
         1714      1716
          /         /
[(((factors T ((wchar32)(wchar16)))   1715
       (typedef wchar_t [(wchar32 {unsigned int})
                         (wchar16 {unsigned short})])))  } 1717
]
1713
```

FIG. 17

```
(selection-set S (a) (b) (c) (d) (e) (f) (g))    1801
    ...
         [((a b c d e)                    1804
1803 {        (enum colors
                  [((a b c) Red)] ... [((c d) Blue)(else Black)] ... ))]

1806
         [((factors (or a b c d e) ((a b) (c) (d) (e)))
1805 {        (enum colors
                  [((a b c) Red)] ... [((c d) Blue)(else Black)] ...
                            ))])]
```

| a b | (enum colors Red ... Black ... ) |
|---|---|
| c | (enum colors Red ... Blue ... ) |
| d | (enum colors ... Blue ... ) |
| e | (enum colors ... Black ... ) |
| (not (or a b c d e)) == f g | /* enum colors undefined */ |

```
(header "unistd+.h"
  (include "sys__types.m")
  ...
  [((factors T ((wchar32)(wchar16))  ((off32) (off64)))
    (function pwrite_wchar int
                          ((filedes int)
                           (char [(wchar32 wchar_t)
                                  (wchar16 wchar_t)])
                           (offset [(off32 off_t)
                                    (off64 off_t)])))))]
  ...)
```

1905 1906 1907 1908 1903

1901

| | |
|---|---|
| wchar32 off32 | (function pwrite_wchar int<br>((filedes int)<br>(char wchar_t$_{wchar32}$)<br>(offset off_t$_{off32}$))) |
| wchar32 off64 | (function pwrite_wchar int<br>((filedes int)<br>(char wchar_t$_{wchar32}$)<br>(offset off_t$_{off64}$))) |
| wchar16 off32 | (function pwrite_wchar int<br>((filedes int)<br>(char wchar_t$_{wchar16}$)<br>(offset off_t$_{off32}$))) |
| wchar16 off64 | (function pwrite_wchar int<br>((filedes int)<br>(char wchar_t$_{wchar16}$)<br>(offset off_t$_{off64}$))) |

Definitions that are defined on suse6_1 but not on rh6_2

A B C D E F H I  
L M N O P R S T   } 2003  
U

AF_AAL5  
ALGORITHM_LEFT_ASYMMETRIC  
ALGORITHM_LEFT_SYMMETRIC

ALGORITHM_RIGHT_ASYMMETRIC  
ALGORITHM_RIGHT_SYMMETRIC

_begx    bfd_mach_sh4  
_begy    _BOOTPARAM_H_RPCGEN

_BSD_VA_LIST_

CAPI20_GET_MANUFACTURER  
CAPI20_GET_MESSAGE  
CAPI20_GET_PROFILE  
CAPI20_GET_SERIAL_NUMBER  
CAPI20_GET_VERSION  
CAPI20_ISINSTALLED  
CAPI20_PUT_MESSAGE  
CAPI20_REGISTER  
CAPI20_RELEASE  
CAPI20_WaitforMessage  
CAPI_ALERT  
CAPI_CMSG_HEADER  
CAPI_CONF  
CAPI_CONNECT CARD_ACTIVE  
CARD_DETECTED  
CARD_FREE  
CARD_INITSTATE  
CARD_LOADING  
CARD_RUNNING  
CILEN_LZS_COMPRESS  
CI_LZS_COMPRESS  
CONFIG_82C710_MOUSE  
CONFIG_AUTOFS_FS  
CONFIG_BINFMT_AOUT  
CONFIG_BINFMT_MISC  
CONFIG_CONFIGLANG_ENGLISH  
CONFIG_EEXPRESS_PRO100

Adaptive Interface Definitions

...

AWE_VOICE_MAP_SIZE                                              2101 linux/awe_voice.h     #define AWE_VOICE_MAP_SIZE sizeof(awe_voice_map)

...

AX25_N2                                                         2102 suse6_1     linux/ax25.h define AX25_N2 3 rh6_2     netax25/ax25.h

...

AX25_WINDOW (or rh6_2 suse6_1)     linux/ax25.h define AX25 WINDOW 1 rh6_2     netax25/ax25.h                                   2103

FIG. 21

A_ALTCHARSET

|  |  | 1 | 2 |
|---|---|---|---|
| (or rh6_2 suse6_1) | 1 |  | dlc |
| rh6_2 | 2 | dlc |  |

2201

| | | | |
|---|---|---|---|
| 1 | (or rh6_2 suse6_1) | curses.h | #define A_ALTCHARSET \ <br>     NCURSES_BITS(1UL,14) |
| | rh6_2 | ncurses.h | |
| | rh6_2 | ncurses/curses.h | |
| | rh6_2 | ncurses/ncurses.h | |
| 2 | rh6_2 | slang/slcurses.h | #define A_ALTCHARSET 0x8000 |

2202

FIG. 22 aSYSTEM

|  |  | 1 | 2 | 3 |
|---|---|---|---|---|
| rh6_2 | 1 |  | dlc | dlc |
| suse6_1 | 2 | dlc |  | dlc |
| (or rh6_2 suse6_1) | 3 | dlc | dlc |  |

| | | | |
|---|---|---|---|
| 1 | rh6_2 | linux/ncp.h | `#define aSYSTEM \`<br>`    (__constant_ntohl(0x04000000))` |
| 2 | suse6_1 | linux/ncp.h | `#define aSYSTEM (ntohl(0x04000000))` |
| 3 | (or rh6_2 suse6_1) | linux/smbno.h | `#define aSYSTEM (1L<<2)` |

FIG. 23

ADAPTIVE INTERFACE FOR A SOFTWARE DEVELOPMENT ENVIRONMENT

CROSS REFERENCES TO RELATED APPLICATIONS

The present patent application claims priority from U.S. Provisional Application 60/201,051, Oldman, Adaptive interface for a software development environment, filed May 1, 2000.

BACKGROUND OF THE INVENTION

1. Field of the Invention

The invention concerns software development environments generally and more specifically concerns software development environments for writing code that will be ported to a number of different platforms.

2. Description of Related Art

From the moment the second stored program computer became operational, the people who write software have dreamed of being able to write a program once and have it run correctly on all available computers, rather than having to make a different version of the program for each of the computers. The process of taking a program that runs on one computer A and modifying it so that it runs on a different computer B is called porting the program to computer B. Porting has gotten easier over the years. Originally, the program had to be rewritten in the machine language or assembly language used by computer B. Then high-level languages such as Fortran or C made it possible to write the program in a high-level language and compile it into the machine language required by computers A and B. However, each version of the program had to take into account the fact that computers A and B generally ran under different proprietary operating systems. The number of operating systems and the number of different hardware architectures has been reduced over time, but the porting problem remains. Even today, a program which is written for one platform (the combination of a particular operating system running on a processor having a particular hardware architecture) cannot simply be run on another platform as it was written for the first platform, but must instead be ported to the other platform.

More is involved in porting than simply changing code to get it working on the new platform in all but the smallest software development organizations. First a development team gets the original software working on a single development platform. Then the software is handed over to a porting team who have the task of making the original software work on other platforms, termed delivery platforms. This often requires help from the development team, because the porting team may not understand some aspects of the code or the original developers may have coded something that just can't be done on some of the delivery platforms and a major change is required.

Once the porting is complete, the modified source code is integrated back into the original source code, which is often simultaneously undergoing modification for a new version of the software. In addition to the direct labor and equipment costs of porting there are indirect costs:

- The development team must communicate with the porting team to help them resolve issues.
- The porting team has opportunity to introduce bugs into the code.
- Changes made by the porting team must be integrated back into the source base.
- Time differences in the availability of software on different platforms adds to support costs and customer frustration.

Programmers have made many attempts to reduce the costs associated with porting. A major aim of the design of the Unix® operating system and the C high-level language was to provide a standard programming environment for writing programs that would run on different UNIX platforms. Many programs have in fact successfully run on multiple UNIX platforms, but there have always been ragged edges and the UNIX/C programming environment provides little or no feedback to indicate to a programmer whether the code he or she is writing in fact adheres to the standard or is accidentally using non-standard features that are peculiar to the development platform the programmer is writing the code on and that will not work on other platforms.

To make porting simpler in the UNIX environment, the UNIX community attempted to unify around the concept of an application binary interface (ABI), which was a formal description of the calling conventions, data representation, and available services that an operating system that conformed to the UNIX standard would provide to application programs on specific hardware architectures. There were two problems with the effort:

- The ABI's were not broad enough to be really useful to programmers, and
- most vendors of UNIX platforms were unwilling to change their platforms to conform to the ABI.

Some vendors of UNIX platforms, meanwhile, produced utilities which accommodated a program written to run on one platform so that it would run on another platform with the same underlying computer architecture. Examples are DG/UX®'s Application Capture Option, IBM's Linux Application Execution Environment, and an Open Source package called Lxrun. Where these utilities work with a given application program, they solve the portability problem for the application program that they work with and the platforms that they are designed for. There is, however, no guarantee that the utility will work with the given application program, or that if it works, that the next version of the application will work. If the utility doesn't work, it gives the programmer no help in getting the application program itself to work.

The UNIX world has long used the lint utility to help identify portability problems. lint is run on the source code for a program before the source code is compiled and identifies patterns in the source code that may cause problems during compilation or later. Unfortunately, there are many cases where lint can't decide if a code sequence is acceptable or not. It gives up in these cases and produces false-negative messages that engineers have to read past to find any real problems. This is very tedious.

Finally, many software development organizations insulate their application programs from OS differences by writing an abstract operating system, that is, a layer of software that provides a standard interface to the application program and contains the code needed to make the standard interface work with the operating system interfaces for the operating systems the application is to be ported to. Thus, all that is required when an application is to be ported to a new operating system is to port the abstract operating system to the new operating system. This does in fact reduce porting costs, but the abstract operating system is in essence an internal standard. As such, it must be designed, must be agreed to by all parties, must be implemented, and must be maintained.

While the best solution to the porting problem would be its elimination by the adoption of a single standard platform, it has become increasingly apparent that for historical, technical, and commercial reasons, there will be multiple platforms for the foreseeable future. What is needed are tools that help the programmer do the porting that must be done. What is particularly needed are tools that make the programmer aware of potential porting problems as soon as possible and that are easily adaptable to deal with all present and future platforms. It is an object of the present invention to provide such tools.

SUMMARY OF THE INVENTION

The object of the invention is attained through an improved program development environment in which a program which is to execute on a plurality of platforms can be developed. The program development environment includes a compiler for producing object code for a given one of the different platforms from source code for the program. The program development environment is improved by adding a database that describes the platforms and differences between the platforms. The database is accessible to and interpretable by the compiler and the compiler responds to the source code and the database by indicating whether any of the source code is incompatible with any of the differences described in the database. In addition to the database, the program development environment may include a run-time test library that is bound to an application binary produced from the object code and responds to an execution of the application binary by testing whether the application binary is incompatible with any of the differences described in the database. The program development environment may further include a compatibility run-time library for each of the platforms that is bound to the application binary produced for the platform and that performs conversions necessary for compatibility when the application binary for the platform is executed. Additionally, the program development environment may include platform proof code for different ones of the platforms, with the platform proof code for a platform being executed on the platform to determine whether the database correctly describes the platform.

In one version of the program development environment, the database, the run-time test library, the compatibility run-time library, and the platform proof code are all produced by a meta-compiler from a description of the platforms including the differences between the platforms. The language compiled by the metacompiler includes selector names associated with platform and selector constructs that use the selector names to specify bindings of the program constructs for the platforms with which the selector names are associated. The metacompiler makes a tree structure which include tree selectors that represent the selectors, a tree selector specifying a set of bindings for a construct that produce unambiguous readings of the definition of the construct. The meta-compiler then uses the unambiguous readings to generate the database from the description.

Other objects and advantages will be apparent to those skilled in the arts to which the invention pertains upon perusal of the following Detailed Description and drawing, wherein:

BRIEF DESCRIPTION OF THE DRAWING

FIG. 4 shows an example AdI Meta-language source file and the corresponding link-time and runtime source code generated by the AdI Meta-compiler;

FIG. 5 shows example Platform Proof source code generated by the AdI Meta-compiler from the source in FIG. 4;

FIG. 6 shows another AdI Meta-language source which illustrates a case of variation among supported platforms and the header file that would be generated by the Meta-compiler on that source;

FIG. 7 shows the source code for a program being compiled in the AdI environment and error messages output as a result of compilation in the AdI environment;

FIG. 10 is the BNF for forms in the AdI language;

FIG. 11 is the BNF for the selector form in the AdI language;

FIG. 13 is the BNF for the system file form in the AdI language;

FIG. 14 is the BNF for a selection set definition form in the AdI language and an example of a hierarchical selection set;

FIG. 15 is the BNF for the platform-feature-set-prop form in the AdI language and an example of a platform-feature-set-prop;

FIG. 16 is an example of a selection set, selectors in type definitions, and a function interface that uses the type definitions;

FIG. 17 is BNF that describes the extension to the selection-pred form used in t-sel forms and an example of a t-sel;

FIG. 18 is another example of a t-sel showing the readings produced from the t-sel;

FIG. 19 shows the t-sel which analysis produces from the code of FIG. 16 and the readings produced from the t-sel;

FIG. 20 shows an example index page fragment from a report comparing two operating systems;

FIG. 21 shows an example report fragment showing simple non-conflicting declarations;

FIG. 22 shows an example report fragment showing a declaration that differs between the two operating systems; and FIG. 23 shows an example report fragment that is somewhat more complex.

Figure 1:
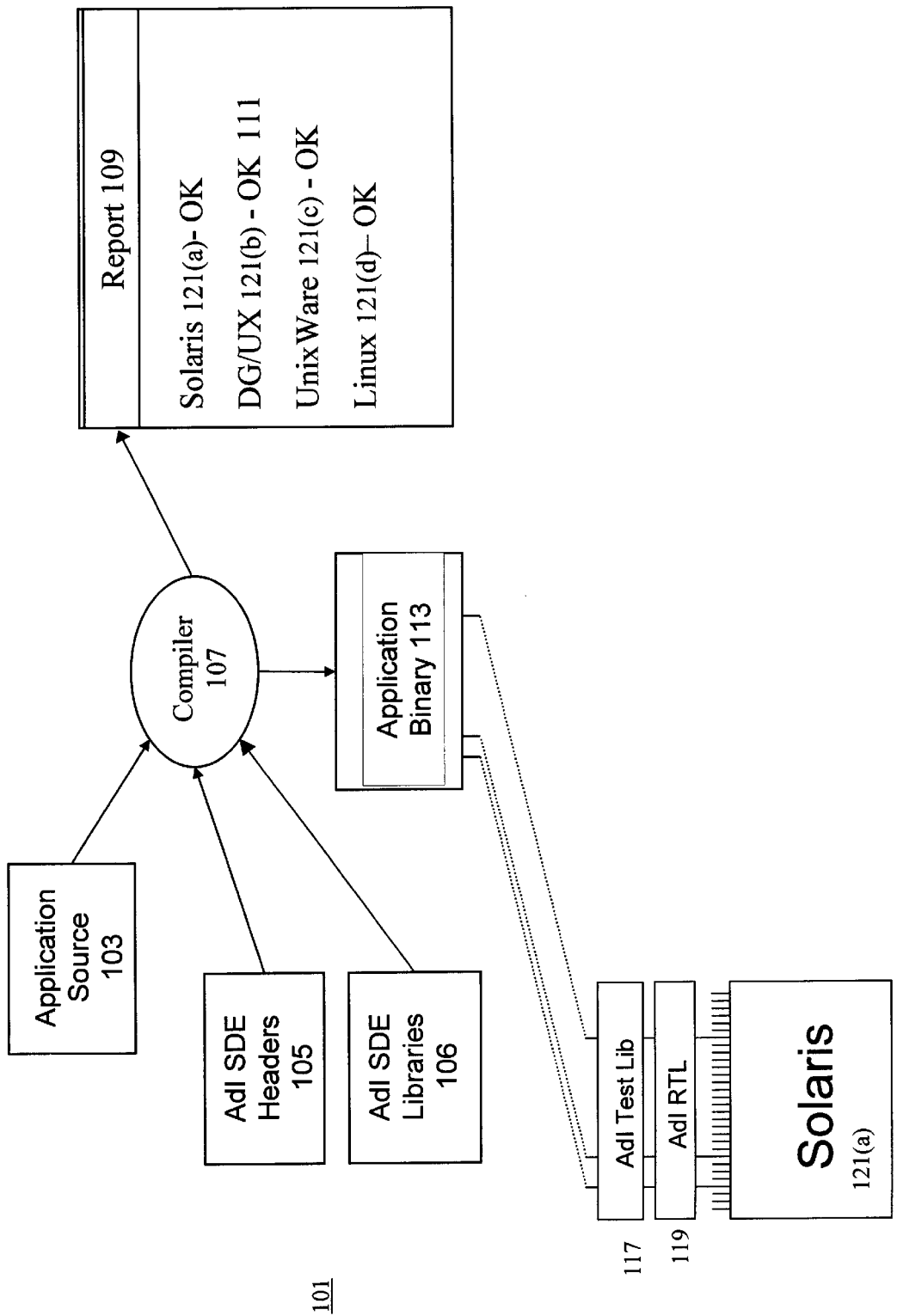
FIG. 1 is an overview of the novel programming environment disclosed herein.
Figure 2:
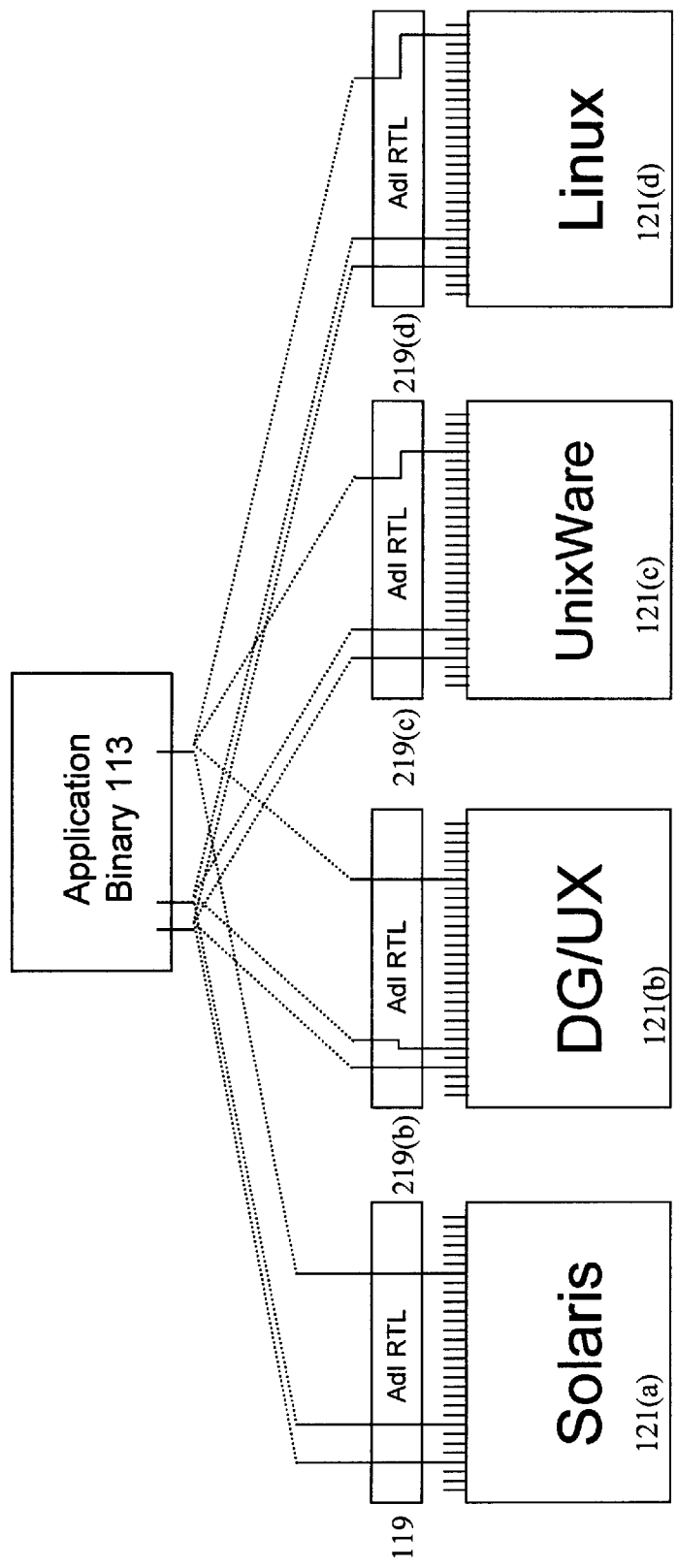
FIG. 2 is an overview of how the novel programming environment is used to port a program to run on a number of platforms that share a hardware architecture.

Reference numbers in the drawing have three or more digits: the two right-hand digits are reference numbers in the drawing indicated by the remaining digits. Thus, an item with the reference number 203 first appears as item 203 in FIG. 2 and an item with the reference number of 1801 first appears in FIG. 18. Elements in one FIG. that appear in a later FIG. retain their original reference numbers. Thus, item 119 in FIG. 2 is the same as item 119 in FIG. 1.

DETAILED DESCRIPTION

The following Detailed Description has two parts. The first part describes the adaptive interface and how it reduces the effort of porting; the second part describes a system and method for building the adaptive interfaces.

Figure 3:
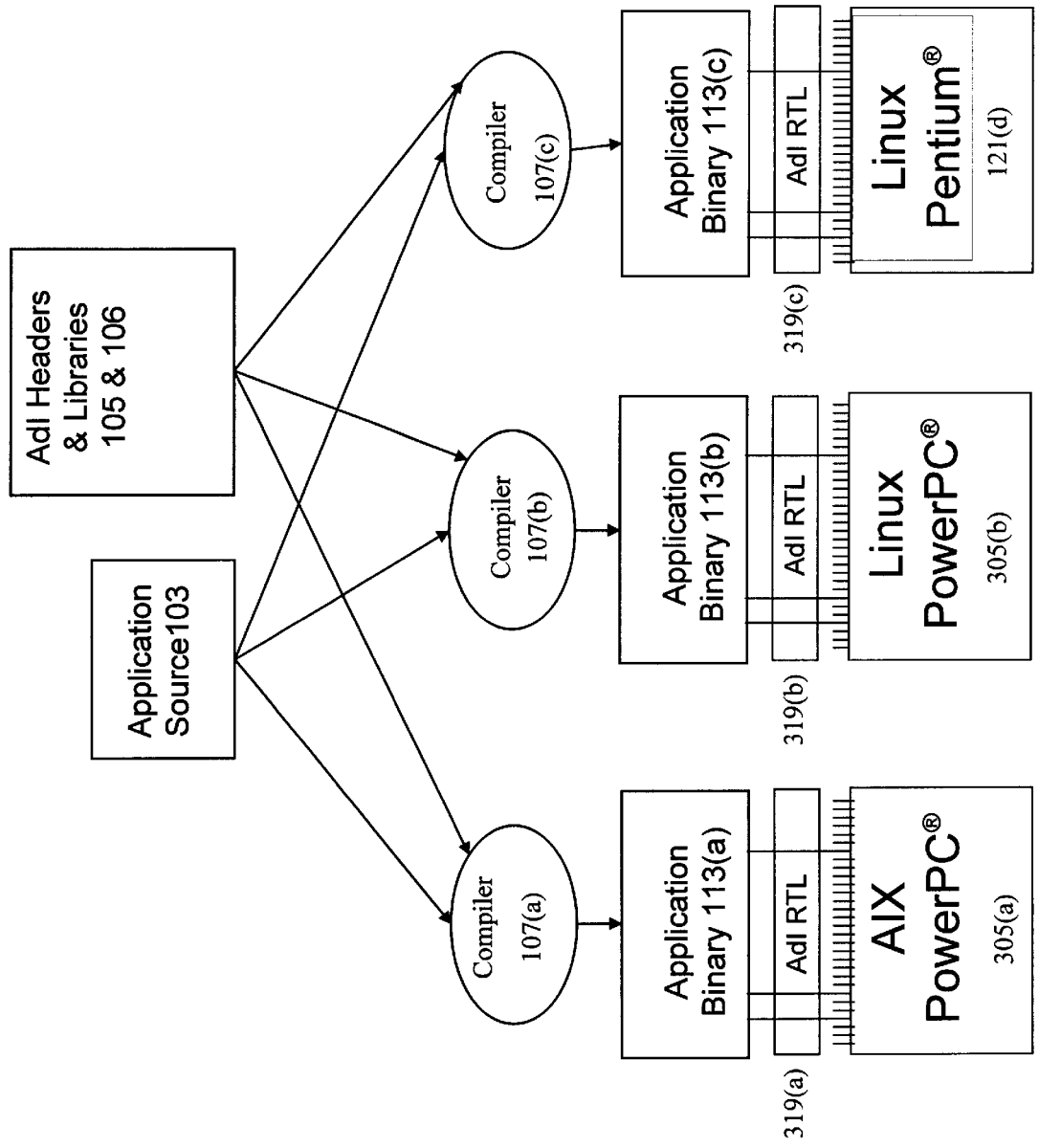
FIG. 3 is an overview of how the novel programming environment is used to port a program to run on a number of platforms that differ in hardware architectures.

The adaptive interface: FIGS. 1–3

FIG. 1 shows a software development environment 101 that permits early detection of porting problems. Software development environment 101 makes application binary 113 for development platform 121(*a*) from application source code 103, which is written in a high-level language. The development environment includes a compiler 107 which is specific to the high-level language in which application source 103 is written and to the development platform 121 upon which application source 103 is being developed. Compiler 107 compiles application source 103 to produce application binary 113, which will execute on platform 121.

Included in software development environment 101 are adaptive interface headers 105 and libraries 106, compiler 107, adaptive interface test-time library 117, adaptive interface run-time library (RTL) 119, and platform 121(*a*). Adaptive interface headers 105 and libraries 106 contain interface information for all services available on the platforms to which the program being made from application source 103 is to be ported. The platforms in this example are 121(*b*. .*d*) in addition to platform 121(*a*), shown in FIG. 2. The descriptions are in a form which permits compiler 107 to read and respond to them in the same fashion in which compiler 107 responds to the header and library files which are normally used in the compilation of source code. As compiler 107 compiles application source 103, it responds to the code in application source 103 and to headers 105 and libraries 106 by producing a report 109 which makes a list 111 that indicates for each of the platforms for which there is a description in headers and libraries 105 whether there are any potential porting problems for the platform.

In a presently-preferred embodiment, compiler 107 is a completely standard compiler for the programming environment 121(*a*) that application binary 113 is to execute on. Compiler 107 includes mechanisms for defining compile-time symbol names and outputting those names in diagnostic messages. The AdI headers and libraries 105 use these mechanisms to define compile-time symbol names in such a way that if they are used in a non-portable way, they will appear in compiler diagnostic messages with the spelling of the symbol name containing a message about the non-portable usage. (See item 608 in FIG. 6 for an example.) In other embodiments, compiler 101 may be specially adapted for use in software development environment 101 and may use special mechanisms to make report 109.

Some porting problems cannot be detected at compile time. One example of such a problem is passing the pathname "/dev/kmem" to the open function. Opening kernel memory is most likely a non-portable operation. To detect these problems, software development environment 101 includes adaptive interface run-time test library 117. Application binary 113 is bound to run-time test library 117 before it is executed and run-time test library generates its own report 109 indicating any problems it finds. Test library 117 is designed to use the actual runtime library for the platform and is coded to only monitor, not modify the behavior of functions belonging to the actual run-time library. Adaptive interface run-time library 119, finally, is a library of routines that deal at run time with certain portability problems such as data conversions.

Once report 109 has made a programmer aware of a portability problem, he or she has two immediate courses of action: either code around the problem or drop the deficient platform from the list of platforms the application is to be ported to. This allows the programmer to move on, but it also gives the programmer (or the programmer's manager) an early warning that allows them to deal with the discovered portability problems without holding up development. They can, for example go to the platform supplier and attempt to get an enhancement. There may also be a way of inventing a portable alternative that can be added to the adaptive interface software development environment. AdI thus gives early warning of porting problems and supplies a mechanism for managing porting issues. It does not attempt to solve all porting problems or force all programs into a limited common model.

FIG. 2 shows a single binary application in production on multiple platforms with the same computer architecture, but different operating systems. The new platforms are 121 (*b*..*d*), the same platforms that were targeted in FIG. 1. Each platform has a unique runtime library (119 and 219(*b*..*c*)) that has an identical binary interface from the application side, but separate translations from that interface into what is expected in the underlying OS. The testing library 117 is not present here. It was only used during testing.

Although not required to do so, software developers may rerun their tests of the original code on all other platforms to which the code is transported to confirm that there are in fact no porting problems that were missed by the AdI environment on the original development platform 121. This step is termed the verify phase. If the AdI headers, libraries, and test library have properly described each of the platforms, the verify phase should never find a problem. If one is found, there is at a minimum a bug in the AdI descriptions, since they should have identified any portability problems when application source 103 was compiled for platform 203(*a*) and the resulting application binary 113 was tested on platform 203(*a*). There may, of course, also be a real portability problem. If there is a real portability problem, it is resolved as described above for problems correctly identified by the AdI. In any case, the AdI descriptions should be enhanced to fix the bug and/or identify the new portability problem. Once verification is complete, the application runs in the same way as it was run during verification.

Note that there was little need to verify on the original development platform 121 (*a*). The AdI test library is designed to have no impact on the behavior of calls to the functions whose calls it checks other than the possibility of slowing down the speed of execution and using a small amount of stack and/or dynamically allocated memory. If the application has no sensitivity to the speed of the system services it uses, then it was completely exercised in the test phase discussed with FIG. 1. Running the verification step would produce identical results as the last test run.

FIG. 3 shows how AdI is used to produce production copies of an application in a different situation. Just like FIG. 2, FIG. 3 is a continuation from FIG. 1, but in this case the underlying computer architecture is different across platforms or this mode is used because the user wishes to minimize the AdI runtime overhead. Thus, platform 305(*a*) has the AIX operating system and the IBM PowerPC® hardware architecture, 305(*b*) has the LINUX operating system and the PowerPC® hardware architecture, and platform 121(*d*) has the LINUX operating system and the Intel Pentium® processor architecture as in FIGS. 1 and 2. Here the programmer has to recompile application source 103 for each hardware architecture. Initial development and testing are done using AdI on one platform, just as before. Verification is also done as before for each of the platforms. As before, problems found during verification are at a minimum AdI description source bugs. Note that the AdI runtime library 319(*c*) may be different from the library 219(*d*). The former may have a binary interface that more closely matches the Linux system than the latter whose binary interface is designed to work on multiple OS's.

Of course, the programmer can also compile for each hardware architecture in the same fashion as shown for the single hardware architecture in FIG. 2. Thus, the programmer could compile for platforms 305(*a*) and 305(*b*) as shown in FIG. 2 and then compile separately for platform 121(*d*).

Figure 8:
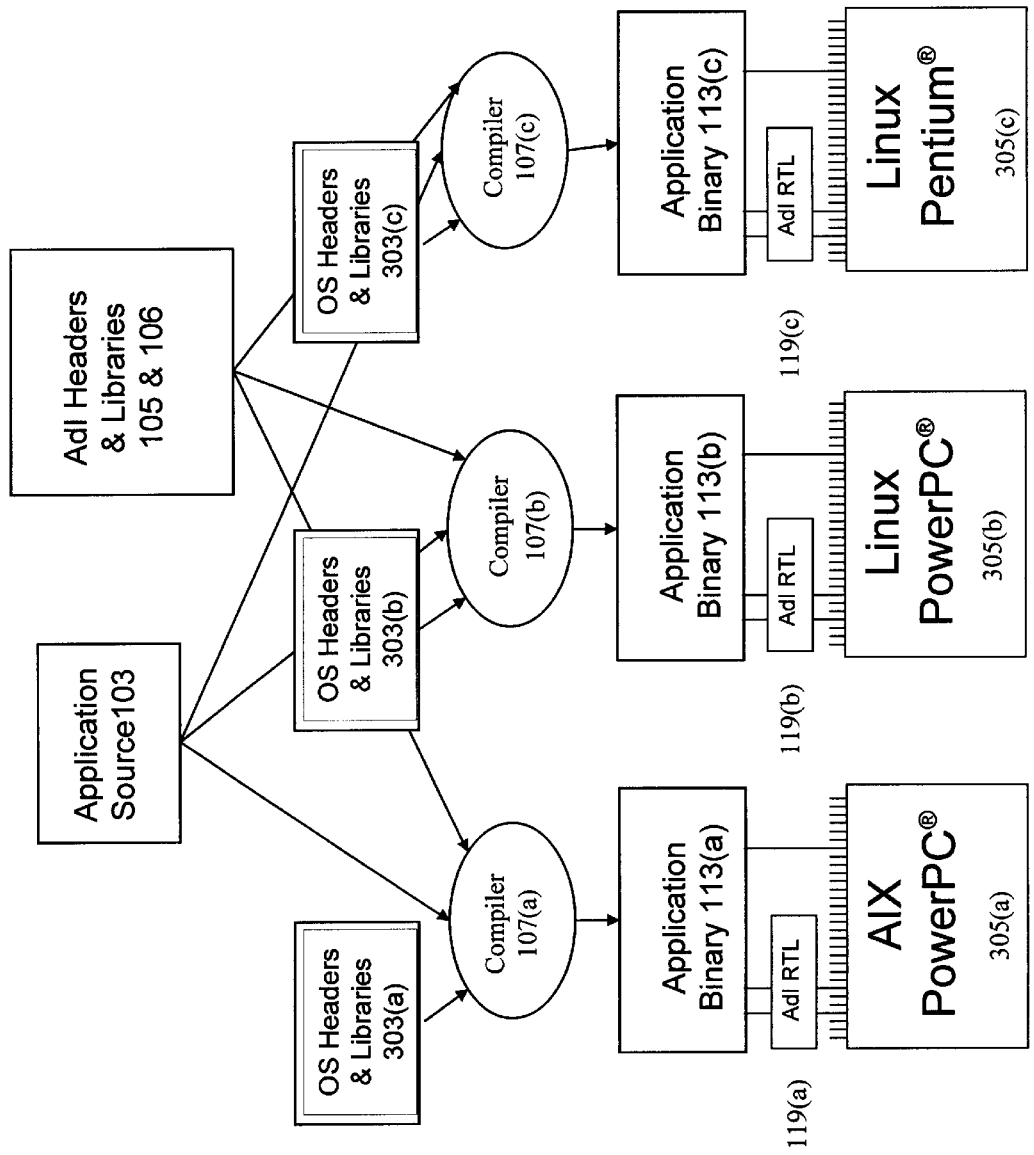
FIG. 8 shows a variation on FIG. 3 where the user chooses to uses the AdI technology in such a way that the small but perceptible performance overhead of the AdI runtime library is eliminated.

FIG. 8 shows a variation of FIG. 3 where as much of the OS headers and libraries as possible are used to absolutely minimize the overhead of the AdI runtime libraries. When this is done, the only components of AdI headers 105 and libraries 106 which are involved in the compilation are AdI-unique functions that were invented to solve particular porting problems.

In summary, AdI offers programmers who are porting an application to a number of platforms the following advantages:
Porting problems are detected earlier in the porting process. This in turn:
Shortens porting time and
Minimizes platform-specific bugs
The porting process costs less because:
Rapid porting results in uniform revision currency between the original version of the application program and the ported versions and
There are fewer platform-specific porting problems
Quality of the ports is improved:
Original developers see porting problems early
Fixes in the ports are more consistent with the original design.

The Adaptive Interface Meta-language

Building an AdI programming environment by traditional methods of writing source language by hand is tedious and error-prone. The Adaptive Interface solves this problem by using a special-purpose programming language called the AdI Meta-language. The language is designed for the particular problems of describing an interface that varies across multiple platforms (and varies across multiple versions of the same platform). The Adaptive Interface system also provides a compiler that transforms this source into the AdI programming environment objects, with the aid of platform-specific development tools such as compilers and linkers. See FIG. 9.

Figure 9:
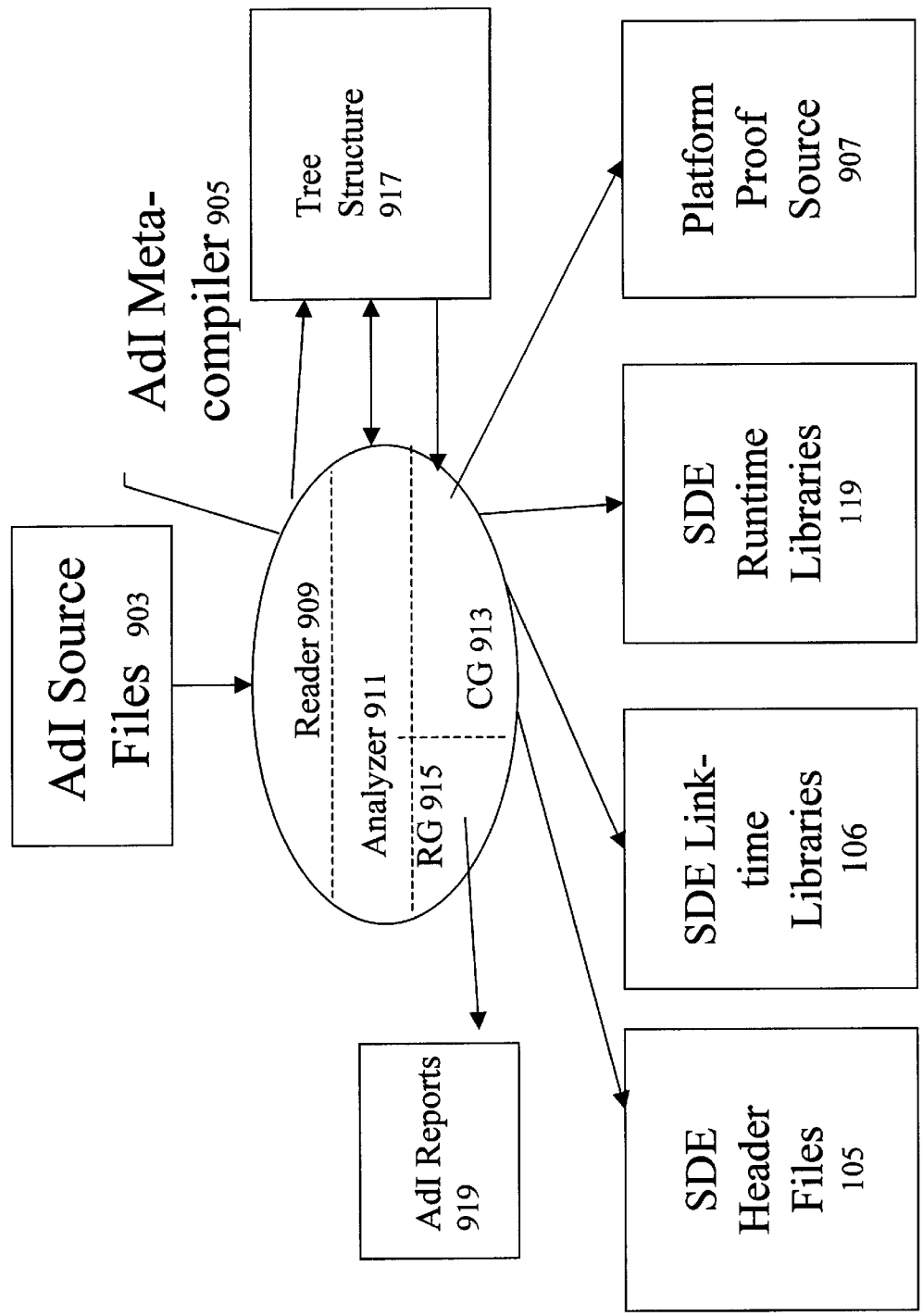
FIG. 9 is an overview of the AdI meta-compiler.

The first three of the generated sets of components illustrated in FIG. 9 (references 105, 106, and 119) are the same components described above. The fourth, Platform Proof Source 901 is a set of files that the AdI Meta-compiler generates that are used to aid in writing correct Meta-language source. The Platform Proof Source is a set of programs and a build/run make file. The programs are constructed to test the consistency between what was encoded in the Meta-language source for every platform and what the platform actually supplied. Executing the build/run make file (by invoking the Gnu make utility) on each platform will attempt to build and run the test programs. If they correctly build and run then the AdI Meta-language source was consistent with the platform. If not, the meta-language was inconsistent in some way such as naming a function that did not exist or defining a macro constant to be a wrong value.

Examples of ADI-generated Headers and Source Code: FIGS. 4 and 5

These examples of the header files and source code generated by the AdI Meta-compiler are from a version of the environment which is used with a C compiler, possibly the Gnu C compiler, on a platform running the Unix operating system. The header files and source code consequently follow the conventions of the C language, the Unix operating system, and the Gnu C compiler under appropriate conditional compilation. In embodiments for other environments, the header files and source code would follow the conventions of those environments.

In the examples of FIGS. 4 and 5, an AdI source file called module1.m 401 consists of a description of the header file t1.h and the interface definition for a single function fun1. This header file and its one function are written assuming that the file and its function description are provided on all platforms that are supported by the programming environment generated from this source. (See FIG. 6 for an example of a restricted definition.)

The AdI Meta-compiler converts the source 401 into C-language components which contribute (with or without further processing) to the four sets of components illustrated in FIG. 9.

At 403 is shown the header file include/t1.h in the AdI headers 105 that the AdI Meta-compiler generates from the description. The lines at 405 protect the header from accidental reinclusion. The #include at 407 includes a header file which defines a common set of definitions for all compilations in the programming environment. The lines of code at 409 and 412 rename fun1 to a name, __AdI__fun1, which is unique to the programming environment and permits the programming environment to insert logic for referencing the underlying system function fun1 in its own runtime and the platform proof code. The code at 412 takes advantage of a special feature of the Gnu C compiler (and possibly others that have a similar facility), to rename the function's link-time name without changing its source name. This is cleaner because it avoids confusing the user when debugging a program. If such a facility is not available, the code at 409 accomplishes the same thing with the more standard, but less desirable macro define facility. The __AdI__EXTERN symbol labeled 411 is a macro invocation that declares the function to be external in a way that permits header 403 to simultaneously support the C and C++ languages.

At 413 is shown the link-time source code 413 generated by the AdI Meta-compiler. Shared libraries used at link time tell the linker the names and other information needed at link time of functions and variables that the runtime-equivalent of the library will provide. This code provides the information needed by the system linker to reference these functions from an application binary such as 113. The #include statements add the source code that helps in implementing the AdI programming environment. At 415 is shown an invocation of the __AdI__stub__function macro for __AdI__fun1. This macro expands to a function declaration that has the appropriate name, but not the correct interface or any implementation. The name and the fact that it is a function is sufficient for linking. The link-time source contains such an __AdI__stub__function invocation for every function that has been declared in the programming environment. Note that the modified name of the function is used because the function's interface declaration 409, 411, and 412 renamed all fun1 references to __AdI__fun1.

The source code 413 is converted into binary form once for every platform where it is intended to be used by invoking a make script that was generated by the AdI Meta-compiler on each platform.

The runtime source code generated by the AdI Meta-compiler from source 401 is shown at 417. The module again includes the AdI implementation and the AdI run time tools at 418; it also includes the underlying system header file at 419. The code itself consists of the single line shown at 420. The line, __AdI__jumpfcn(__AdI__fun1,fun1) specifies that the compiler generate assembly language instructions which cause any calls to __AdI__fun1 to redirect to the underlying system function fun1. No more is required here because fun1 with the interface defined in source 401 is available in all of the platforms with an identical interface. If there were differences in the versions of fun1 on the platforms, for example, differences in the order of the arguments or their data types, the generated run-time source would deal with those differences, for example, by including code which changed the order of the arguments or making data type conversions as required for the various platforms. Such code is free to call on other system and AdI-environment-specific functions to perform its operation. In cases where this is a new abstraction, it will not call an underlying function since it does not exist.

FIG. 5 shows platform proof source 501 that is compiled and run to perform the platform proof for AdI meta-source 401. Platform proof source 501 is thus an example of AdI platform proof source 907. Beginning at 503, platform proof source 501 includes the header t1.h for the platform that source 401 is being ported to. The actual verification is performed by the function __AdI__prove ( ) 505, which is called by the main procedure that is included in every compiled C program and that is called by the operating system to begin the program's execution. The function sets a test count variable to 0 at 506 and then, as shown at 507, assigns the address of fun1 (which is expected to be defined by all platforms in t1.h) to the function pointer __AdI__x 508. The program code specifies that the pointer variable, __AdI__x, be to a function which has the interface which the description used to generate platform proof source 501 indicates is the interface of fun1 on all of the platforms. If the description is incorrect and fun 1 has a different interface on the platform, the compiler will generate an error message for assignment 507 indicating that the assignment is improper, thus indicating an error in the description. The statement at 509 simply assigns 0 to the pointer so that the compiler does not generate an error message indicating that no value has been assigned to the pointer. The statement at 510 increments the test count (setting it to 1 in this case), indicating that the test was performed.

The above example performs the important proof step at compile time when the assignment at 507 is checked for validity. Other tests such as the expected value of a macro constant are checked at runtime when the __AdI__prove function is executed.

The part of the __AdI__prove function with the reference number 513 is a set of conditionally-compiled statements that ensure that the appropriate number of individual tests are performed for each platform. In this example, all platforms have the same number of tests. In examples where there are differences among platforms, the number of tests may vary. This check of the test number is a sanity check that the compiler emits to ensure that all generated assertions are appropriately checked. If the compiler and build/test scripts are correct the number of tests will always be right.

Example of Detection of a Porting Problem at Compile Time: FIGS. 6 and 7

In the example of FIGS. 4 and 5, the description of the platforms indicates that the function fun1 is available on all of the platforms; consequently, it does not become apparent until the platform proof stage that fun1 is was in fact available on a limited number of the platforms. In the following example 601 in FIG. 6, the description has been corrected to include a selector form 605 which indicates that fun1 is only available on operating systems whose platform description in the AdI meta-language defines the selector name tos2. A selector name is a name that is used to select among alternative structures in the various platforms. In the example, tos2 is defined for the target platform targ2, but not for the target platform targ1, and is thus expected on platform targ2 and not on targ1.

The AdI meta-compiler compiles description source 601 to produce generated header 607 along with other components that are not shown here. The portion of generated header 607 which is different from generated header 403 is shown at 608. Conditional compilation directive 609 indicates that if the program that includes the header t1.h is being ported to targ1 as well as targ2, an error message will be output to report 109 indicating that fun1 is not defmed for targ1 if the function fun1 is referenced by the application program. That the error message should be output for targ1 is indicated at 611 and 613.

611 and 613 show two techniques for outputting the error message. The technique shown at 611 assumes that a macro AdI__compiler__integration has been predefined for the compiler being used to compile the program being ported. The macro is executed in a preprocessing step, and as a result, the preprocessed header includes the special form __AdI__function__missing. The special form instructs the compiler to both type check invocations of functions that the AdI description indicates are of interest and to output a message when a function is not available for a particular target and it is referenced. The technique shown at 613 presumes no modification whatever of the compiler to accommodate the AdI development environment. The #define directive at 613 defines fun1 as a macro whose value is a symbol whose name is the error message AdI__error__fun1__is__not__defined__on__targ1. The symbol is otherwise not defined, and when the object file created by the compilation is linked, the undefined symbol will result in an error message from the linker which will output the name of the undefined symbol, and thus output the AdI error message.

FIG. 7 shows what happens when a user of the AdI program development environment compiles a program that includes an invocation of the function fun1. The source text for the program is shown at 701; the function is invoked in the second line of the function main ( ) at 702. To compile in the AdI environment, one places the AdI bin directory at the front of PATH in the shell environment and then invokes the compiler normally. The AdI bin directory includes a script that defines preprocessing macros that redirect explicit and implicit references to standard headers and libraries and indicates to the compiler the targets one is interested in. If the user indicates no particular interest, AdI assumes that the compilation is for all supported platforms.

What happens in the compilation depends on the degree of integration of the compiler into the AdI development environment. 703 shows compilation with the standard Gnu C compiler. The shell command for the compilation is at 705; since no target is specified, AdI assumes that both available targets, targ1 and targ2, are intended. The shell command for linking the compiled object code is at 707; because there was no definition for fun1 in the target, the compiler defines the error message symbol as shown at 613, and at link time, because the error message symbol is otherwise not defined, the linker error message at 709 contains the symbol's name, and thus the error message. 711 shows compilation with more integration; here, a properly-labeled AdI error message is output during compilation. With either technique, the user is made aware while compiling or linking the program on a single platform of the existence and nature of any porting problems on other platforms that are captured by the AdI description for the platforms.

Making an AdI Description of a Set of Platforms: FIG. 9

As shown in FIG. 9, the actual description of a set of platforms to which a program is to be ported is contained in AdI source files 903. AdI source files 903 are written in a preferred embodiment in a language called the adaptive interface or AdI language. The source files are then compiled by a compiler 905 for the AdI language to produce SDE header files 105, SDE link-time libraries 106, SDE run-time libraries 119, and platform proof source code 907. In order to distinguish compiler 905 from compiler 107, compiler 905 will be termed herein the AdI meta-compiler. The following discussion will begin with an overview of the AdI source files 903 and of the AdI language and a detailed discussion of selectors, which are the constructs that the AdI language uses to describe differences between platforms, and will then provide an overview of the AdI meta-compiler and a detailed discussion of the manner in which the meta-compiler treats selectors.

Overview of the AdI Language: FIGS. 10–11

The preferred embodiment of SDE 101 is designed to port programs written in the C or C++ languages; this embodiment of the AdI language thus looks like a combination of the well-known Lisp and C programming languages. The Lisp-like components provide a high-level organization for a collection of chunks of C declarations and code. In other embodiments, the chunks and declarations would be in the language compiled by compiler 107. FIG. 10 shows the basic structure of the language. In FIG. 10 and elsewhere, the AdI language is described in a BNF grammar styled after the well-known BNF grammar used in the ANSI C standard. Syntactic categories (nonterminals) are indicated by italic type, and literal words and character set members (terminals) by bold fixed-width type. A colon (:) following a nonterminal introduces its definition. Alternative definitions are listed on separate lines. An optional symbol is indicated by the subscript suffix "opt".

As may be seen from BNF 1001 in FIG. 10, AdI source code is made up of a list of forms; each form is surrounded by parentheses, as shown at 1003. The parentheses may contain form-parts, including other forms. Each AdI source file 903 defines a header file 105 and source code that contributes to one or more of the libraries 106 and 119 and the platform proof source code 907 associated with the header file 105. Also necessary for compilation of an AdI source code file 903 is a system file. The system-file is a set of parameters that are common to all compilations for a given set of platforms. The file defines a collection of names that are valid in other sources as well as specifying one or more platforms. When the metacompiler is invoked, a single platform is designated as the reference platform and a set of the platforms, optionally including the reference platform, are selected as target platforms. The reference platform defines the source interface for the generated SDE. The targets are the platforms that are supported to run applications built for the SDE.

For the purposes of the present discussion, the most interesting form in the AdI language is the selector, which is used to describe differences between platforms. FIG. 11 shows the BNF 1101 for the selector form. The selector form is a kind of conditional compilation that can control the interpretation of source in almost any context. Unlike traditional conditional compilation that is performed in a pre-processing pass over the source code, the selector forms are part of the syntax managed by the compiler. In fact, the compiler compiles all combinations of conditional compilation that are requested in the platform-def forms in the system file for all targets at once.

Each selector-name 1109 in the above grammar is a name that belongs to any of a number of hierarchical sets of names defined in selection-set-def forms in the system file. Some restrictions apply and will be explained later. In any given context, one of the leaf selector names from that set of names is defined. AdI metacompiler 901 selects at most one of the choices offered by the selector-choices in selector 1103, with the selection being made based on the context and a left-to-right reading of the selector choices. The selected choice is the first one to have a selection 1107 that evaluates to true in the given context or, if none of the names evaluates to true, the else choice, if one is present. The forms that are selected syntactically replace the entire selector form and are interpreted as if the selector had not been supplied.

Figure 12:
FIG. 12 is an example of a selection set definition, of a selector, and the results of application of the selector.

FIG. 12 gives an example of the use of selectors. The selectors in FIG. 12 are from an AdI source file that is being used to port software to platforms running the AIX®, Linux®, DG/UX®, and UnixWare® operating systems. These operating systems are all variants of the original UNIX® operating system and consequently use many of the same names for literals, albeit at times with different values. The following table shows the C-preprocessor macro names and values for the various platforms:

| Literal name | Operating system | Defined? | Value |
| --- | --- | --- | --- |
| RTLD_LAZY | all | y | 0x0001 |
| RTLD_NOW | all | y | 0x0002 |
| RTLD_GLOBAL | Linux | y | 0x0100 |
| | all others | y | 0x0004 |
| RTLD_LOCAL | UnixWare, AIX | y | 0x0008 |
| | all others | n | |

As may be seen from the table, RTLD_LAZY is defined and has the value 0x001 in all of the platforms, while RTLD_GLOBAL is defined for all platforms but its value varies and RTLD_LOCAL is defined only for UNIXWARE and AIX.

The names used in the selectors of the example are defined in the system file as shown at 1201. At 1203 are shown a set of define-def forms that are used to create macro definitions. The define-def forms contain the selectors. Each selector has a selection predicate 1109. The selection-predicate in BNF 1101 is composed of names, operators and parentheses that evaluate to a Boolean value each time the compiler evaluates it. The Boolean value of a selector name is determined by the platform chosen for the reading context of the compiler. A name is true if it appears in a platform-select-prop 1201 in the platform's platform-def. It is false if it does not. Thus, in selector 1205, there are two selection predicates, the selector name linux and the AdI language-defined predicate else, which has its usual meaning. Selector 1205 thus indicates that when the target platform has the LINUX operating system, RTLD_GLOBAL will have the value 0x0001 and otherwise the value 0x0002. Selector 1207 illustrates the use of the OR logical operator. The list of selector names (unixware aix) indicates that if either of these platforms is the target, RTLD_LOCAL will have the value 0x008; since there are no selector predicates for RTLD_LOCAL for the other platforms, RTLD_LOCAL is undefined for those platforms. If application source 103 contains the literal RTLD_LOCAL and is compiled by compiler 107 with an AdI header file 105 made from an AdI source file 903 containing selector 1207 and the target is a LINUX or DGUX platform, report 109 generated during the compilation will include a warning that RTLD_LOCAL is not defined for the platform.

The operators in the selectors are interpreted as follows:

or—logical or

Is true if any of the alternative selection-predicates are true. This operation is so common that if no sel-lop operator is present, then an or operator is assumed.

and—logical and

Is true if all of the alternative selection-predicates are true.

not—logical negation

Is true if the selection-predicate is false.

<=<>>=—relation operators

Each of these operators are true if any of the names in the selected range are true. The range is determined by starting with the set of names defined by the root selector name of the selector-name and choosing those where the relation operator is true. For example, saying (<linux) in the previous example would be the same as saying (or aix dgux).

Defining Selector Names and Relating Them to Platforms: FIGS. 13–16

As mentioned above, the system-file is a set of parameters that are common to all compilations for a given set of platforms. Among the parameters defined in the system file are selector names. The system file also relates selector names to platforms. FIG. 13 shows BNF 1301 for the system file. The file defines a collection of names that are valid in other sources as well as specifying the reference platform that selects the source and binary interface for the generated SDE. Of particular interest in the system file are selection-set-def 1303, which defines the set of names that may be used in selectors and platform-def 1305, which defines the reference and target platforms.

FIG. 14 shows BNF 1401 for selection-set-def 1303 and an example selection set definition 1407. A selection-set-def defines a hierarchical enumeration of names 1405 that are used in selector forms. Like C enumerations, each selector-name must be unique, both within the selection-set-def and with respect to other selection-set-def forms.

Unlike C enumerations, the selection-set-def forms a hierarchy of names. Any name defined with an associated sub-selector is an abbreviation for the set of all names defined in the sub-selector. The top-level name in a selection-set-def is called its root selector name. A name that does not have an associated sub-selector is called a leaf selector name. Leaf selector names are used to identify specific implementations, to name properties that further specify an implementation, or to name feature sets that define concurrent support in a library that is under control of conditional compilation.

The hierarchy of names is shown at 1411 in example selection set definition 1407. unix at 1409 is the root selector name in definition 1407; linux at 1413 is the root selector name in subhierarchy 1411; bobx at 1415 and the other names in 1411 are at the bottom of the hierarchy and are thus leaf selectors. The following table shows abbreviation of names at a lower level of the hierarchy defined by definition 1407 by names at a higher level.

| Selector name | Set of lower-level selector names for which the selector name is an abbreviation (names marked with + are leaf names) |
|---|---|
| unix | linux solaris unixware+ |
| linux | bobx+ janx+ joex+ |
| solaris | solaris2_6+ solaris2_7+ |

Selection set names live in a separate namespace from other identifiers. There would be no conflicts with using the names main, typedef, or selection-set. A reference to a selector-name may not appear until after the selection-set-def form that defines the selector-name.

As was implied above, the selector forms are syntactic entities that control the interpretation of the AdI source in a context sensitive manner. That interpretation is termed herein a reading of a given form. If the reading is in the context of the reference platform, then it is called a reference reading. If it is in the context of a target platform, it is called a target reading.

Reference and target platforms are described in platform-def forms 1305. Each platform-def form defines the name for an abstract "platform" which is a collection of settings and controls that apply when the platform-name is designated as the reference or one of the targets of compilation. Each platform-name must be unique among all platform names. Platform names are in a separate namespace. References to platform names do not appear anywhere in the AdI language grammar. They are the keys that the compiler uses to control interpretations and select subsets out of AdI source 903

The part of the platform-def which is of particular interest in the present context is the platform-feature-set-prop, which specifies the feature sets supported on the platform specified by the platform-def A feature set is the set of variations in an interface for a service that are particular to the platform described by the platform-def FIG. 15 shows the BNF 1501 for platform-feature-set-prop and an example 1507 which shows two selection set definitions 1407(*a*) and (*b*) and a portion of a platform-def 1509 which contains feature set definitions for that platform for the selector names defined in the selection set definitions 1407(*a*) and (*b*).

Beginning with BNF 1501, platform-feature-set-prop introduces a feature set that is supported on the platform. BNF 1501 defines platform-feature-set-prop as the feature-set keyword followed by a list of feature-definitions. A feature-definition has a name and a predicate-prologue. The name must be a leaf selector name and associates that selection set member with this feature set. Each selector-name in a platform-feature-set-prop must be from the same selection set. The predicate-prologue has two forms. It is a name for the most common case, and a c-predicate c-prologue pair for unusual circumstances. The c-predicate is a string that holds a preprocessor expression that must be true on the defined platform during verification and build. The c-prologue is a preprocessing code sequence that is inserted ahead of all compilation if this platform is used as a reference platform.

The name form merely tests and sets the name. Thus, (environment FOO)

is the same as (environment {defined(FOO)} {#define FOO})

More than one platform-feature-set-prop form may appear in a platform-props sequence. The AdI compiler assumes that all features are independent and handles all combinations of all defined feature sets. A feature set must be complete. That is, one of the predicates must always be true or an error will be reported. The first feature-definition in a platform-feature-set-prop is the default for this feature in the SDE.

Continuing with example 1507, the selection set definitions 1507(*a*) and 1507(*b*) define four leaf selectors 1415: bsd-signals-off, bsd-signals-on, large-files-off, and large-files-on. The platform-def 1509 in which the two platform-feature-set-props 1511(*a*) and (*b*) appear is a platform definition for a platform that is running DGUX, a version of the UNIX operating system, on a processor that has the IA-32 architecture. On this platform, the BSD_SIGNAL_FLAVOR C-preprocessor macro in an application program indicates whether the application program presumes the signal behavior of the BSD version of the UNIX operating system or the default of System V signals behavior, while the value of the _FILE_OFFSET_BITS macro in the source code indicates whether the program being compiled assumes that files can have 64-bit offsets or that files can have 32-bit offsets.

The feature set is used in two aspects of the AdI SDE. First, if the dgux-ia32 platform is chosen as the reference for compilation, then the two macros, BSD_SIGNALS_FLAVOR and _FILE_OFFSET_BITS, are part of the programming interface to control those features for all platforms. The AdI system performs a sanity check on all compilations. The sanity check ensures that one and only one of the c-predicate forms is true and that the selector name from the feature-definition that was selected is defined in a feature-definition for every platform requested by the user. That is, that the feature-set is correctly controlled and that the selected feature variant is supported on all requested platforms. The second use of the feature set is to ensure that the feature is properly controlled when creating library components on each platform.

Details of AdI Meta-compiler 905: FIGS. 9, 16–19

AdI meta-compiler 905 is organized into three phases:

Reading—Converts AdI language source files 903 in ASCII form into an internal tree structure.

Analysis—Checks the trees for correctness, resolves names to definitions and organizes information for simpler access.

Code Generation—Generates C-language source, make files, documentation, installation scripts, and other miscellaneous components. The make files are used to convert the generated source into the AdI SDE's binary components.

These phases appear in FIG. 9 as the compiler components reader 909, analyzer 911, and code generator 913. Reader 909 reads AdI source files 903 and produces a tree representation of them which appears in FIG. 9 as tree structure 917; Analyzer 911 then processes the tree representation to improve the efficiency with which it represents information, and code generator 913 then uses tree structure 917 as modified by analyzer 911 to produce the components which make up the ADE programming environment. Report generator 915, finally, uses tree structure 917 to generate reports that can be used by end-users of the SDE to see the set of supported services and any differences among the supported platforms.

For the most part, AdI metacompiler 905 uses standard techniques in making, modifying, and using tree structure 917. In addition to the tasks handled by standard compilers, however, the AdI compiler must manage the computational complexity of performing a "simultaneous" compilation of many dozens of target platforms.

A simple, but naive approach to compiling AdI components for the target platforms would be to merely take each target and compile it separately from the source. That almost works until you think about the requirements of feature sets. Each feature set introduces multiple variants for every platform that supports it. That number is multiplied by the number of variants in every other feature set since feature sets are independent of each other but can interact as they are used. Imagine two feature sets that control the representation of base types defmed in The Single UNIX® Specification:

1. A wide character feature that controls wchar_t, and
2. A large files feature that controls off_t.

One could imagine a hypothetical function called pwrite_wchar that has both types in its interface. FIG. 16 shows the description 1601 of pwrite_wchar in AdI source files 803. At 1603 and 1605 are seen the selection sets 1407 that define the selector names for the 32- and 16-bit wide character sizes and 32- and 64-bit file offsets respectively. These definitions are in the sys-file used with AdI source files 903. At 1607 and 1609 are shown the type-defs for the wchar_t and off_t types. These are in the part of the AdI source file 903 that describes the C source code header file sys/types.h. The wchar_t type definition includes a selector with the wchar32 and wchar16 selector names and the off_t definition includes a selector with the off32 and off64 selector names. All of these definitions are in the sys-file. At 1611, finally, is shown the part of the AdI source file 903 that describes the C source code header file unistd+.h, which includes the interface definition for the function pwrite_wchar. The AdI environment must of course make sure that the use of the interface for pwrite_wchar in application source 103 is correct for each of the platforms to which the application source is to be ported.

Because the interface for the pwrite_wchar function involves two types, each of which is defined with a feature set having two feature alternatives, the interface has four variants:

| Argument type | Size | | | |
|---|---|---|---|---|
| wchar_t | 32 | 32 | 16 | 16 |
| off_t | 32 | 64 | 32 | 64 |

Now imagine feature set A with 2 feature alternatives, a feature set B with 3 alternatives, and a feature set C with 4 alternatives. If these were supported on 5 different platforms there would be 120 combinations of feature set alternatives and platforms to compile. (2×3×4×5=120)

The first step in finding a solution to the complexity problem is to recognize that most AdI declarations are identical on all platforms and that feature sets typically interact with a small proportion of the entire library interface. If we keep track of where the differences are, we can avoid retracing steps that will yield the same answer. Within AdI meta-compiler 803's internal tree structure is a data structure called a t-sel (tree selector) that is a direct analog of the language's selector form. The presence of a t-sel in the tree indicates a point of variation that is context-dependent. During the analysis phase, each selector-choice must be analyzed within its appropriate context to check it for correctness and to gather context-dependent information that is needed later.

When analyzing any form we are immediately faced with the problem of managing complexity. Before we look at a given sub-tree, we don't know if it has any variation or what predicates control the variation. Once analysis is complete on any definition, it is desirable to know about t-sels that are contained in the body of the definition. This information is gathered during analysis and placed just above the definition in the internal tree in a new t-sel if none exists or by modifying an existing t-sel if one already exists.

The effect of doing this is to include information contained in the t-sels in a tree in a single t-sel at the root of the tree. Only this single t-sel need then be considered in code generation.

The information is recorded in a new selection-predicate expression form called sel-factors-expr whose grammar is shown at 1701 in FIG. 17. The predicate is an existing predicate if this form is replacing a predicate in an existing t-sel choice, or is T (true) if this is in a new t-sel. The isel-groups 1702 are a list of independent selection set groupings. That is, each group holds sets of selector-names, where each set of names are from the same selection-set-def form and no two groups have names from the same selection-set-def form. The contained sets, in turn, are groups of one or more names that are uniquely associated with each other in t-sels in the original predicate (if present) and the tree of the choice associated with this predicate. By associated is meant that the names were all together in or expressions. By uniquely associated is meant that no names were in other groupings.

FIG. 17 shows how a selector 1713 including factors form 1715 for wchar_t and typedef form 1607 results from meta-compiler 905's analysis of form 1607. The AdI language's lisp-like syntax allows the internal tree structure to be isomorphic with the source form. This conveniently allows us to represent the internal form in the same notation as source code. The predicate 1714 in the factors expression is T because it is a new t-sel. There is one isel-group 1716 since the only contained t-sel just mentions members of the wchar_size selection set. There are two sets of one member each within the group reflecting the independent appearance of the wchar32 and wchar16 values.

The purpose of factors expression 1715 is to provide sets of bindings that produce an unambiguous reading of the contained tree that logically eliminates all t-sels in the contained tree. In the above example if we assume that wchar32 is true (that is to say bind it to be true and wchar16 to be false), then the contained typedef can be read as follows:

(typedef wchar_t {unsigned int})

When the compiler encounters a t-sel with a sel-factors-expr, it repeatedly operates on the contained tree with a temporary binding to each of all combinations of the members of the isel-groups and a final exclusive iteration. FIG. 18 shows how this works. The AdI source files 903 contain a selection set S of 7 selector names a, b, c, d, e, f, and g, defined at 1801. They also contain the selector 1803, which relates the selector names to members of an enumeration type. The members of the enumeration type represent colors, and selector 1803 defines the enumeration colors whenever the selection set S values a, b, c, d, or e are true. There are two selectors within the enumeration; one of them relates the names a, b, and c to the enumeration value representing Red; the other relates the names c and d to Blue and the rest of the names, i.e., a, b, and e to Black. (The names f and g are excluded above so are not part of the else.) When AdI meta-compiler 905 analyses selector 1803, the result is the selector shown at 1805. The predicate is 1806 (i.e. the same predicate as 1804 with an explicit or operator). Note that the sets (a b c d e), (a b c) and (c d) were split into four independent sets, (a b), (c), (d), and (e) because they had overlapping members. The bindings and readings resulting from this definition 1805 are as shown at 1807.

The bindings in the sel-factors-expor allow the compiler to use a set of tree navigation primitives that can traverse the sub-tree skipping over all contained t-sel structures. The traversal works because the expressions are composed of selector-names and Boolean operators that can be evaluated as constant expressions once the names are bound.

Notice that both a and b could be bound at the same time in the previous example because they were used together uniquely. a, b, and c could not have been bound at the same time, because it would have led to an ambiguous selection in the second contained t-sel.

The t-sel skipping navigation primitives are more than a simple convenience. The AdI language is very liberal in allowing a programmer to place selector forms in many convenient places. If the compiler had to worry about a t-sel at every possible location, its logic would get very complicated. It does not have to worry about every possible t-sel once the tree is initially checked in the analysis phase.

There are a number of places in the compiler where the logic has to iterate over each arm of a t-sel, treating each arm as if it were independently processed within the lexical scope and context that contained the t-sel. The compiler solves this problem with a common paradigm: A function is created to perform the sub-tree processing, but it is written as if there were no t-sel in the root position of the sub-tree that it is processing. The function is not allowed to return a value and is coded in a way that allows it to be executed multiple times without the logic that invoked it from running. The outer logic then passes a sub-tree and the previously mentioned function to a controlling function that operates according to the type of the sub-tree. If it is not a t-sel, then the passed function is called once passing it the sub-tree. If it is a t-sel, then the function iterates through the t-sel choices, binding the selection context to the selection and calling the function with the forms of the selector-choice.

Going back to the wchar_t typedef definition, the analysis phase logic knows that there is a possibility of a t-sel in the type description position of a typedef form. It sets up a function to analyze a type description and passes the function to a general function that analyzes potential t-sels. If that function discovers that the root of the type description tree is a t-sel than it checks the t-sel for correctness and calls the type description analysis function once for each choice with the selection context appropriately bound. If the wchar_t definition had had an error in it, like the following with a misspelled short shown in bold:

(typedef wchar_t [(wchar32 {unsigned int})
(wchar16 {unsigned shot})])

the type description analysis function would report a problem when it was called the second time with wchar16 defined in the environment. The analysis phase's error reporting further notes whether the selection environment is restricted for any selection set and if so adds the phrase "when selection-set-root is selector-name" to any messages. The above error would be something like: typedef wchar_t: ill-formed type description "unsigned shot" when wchar_size is wchar16.)

Details of Tree Manipulations

The AdI compiler is currently implemented in the Lisp programming language. In Lisp, most primitive operations are implemented as functions. The AdI compiler contains its own set of functions that are analogs of many of the Lisp tree manipulating primitives but operate in a context-sensitive manner when encountering a t-sel. These functions use a naming convention of prefixing a "t" to the name of each analogous function. For example, the t-sel sensitive analog for the Lisp function called identity is tidentity. The identity function just returns its argument with no other effects. The tidentity function looks at its argument and if it is a list with a t-sel in its first position, it traverses the t-sel based on the value of a context variable to select the appropriate component. If not, it just returns its argument. Thus, using the selection-set S from above,

```
(tidentity 'x)              => 'X
(tidentity ' ([(a X) (else Y)])) =>  ' (X) if S is bound to a
                                     ' (Y) otherwise
```

The tidentity function looks down into the tree for a t-sel because a t-sel may represent nothing in some contexts. Rewriting the previous example somewhat we get,

```
(tidentity ' ([(a X)] Y)) =>  ' (X Y) if S is bound to a
                              ' (Y) otherwise
```

The tidentity function is important in that it provides the basic semantics for the other t-sel-sensitive tree walking operations. Considering the two basic Lisp tree (list) manipulating functions car (a.k.a. first) and cdr (a.k.a. rest) we get (tcar x) is (car (tidentity x))

(tcdr x) is (cdr (tidentity x))

The tidentity function only looks for t-sels that are in the beginning of trees (lists). Thus in all contexts (tidentity '(X [(a A)])) =>'(X [(a A)])

If a part of the compiler wanted to access the second list element of the list L, it would say (tcar (tcdr L))

This same concept could be implemented in other languages. In C one would have to replace the use of the syntactic pointer field selection operator "−>" on tree structures with a function call that would perform the tidentity operation. In C++ one could define the tree class to behave appropriately.

Looking back at the unistd+. h header shown at 1610 in FIG. 16, we see no selector forms there, but we stated earlier that there were four different variants of the function. The discovery of that variation arises from the application of name resolution during the analysis phase. Whenever a name is encountered in a context where it refers to another definition, the compiler finds the appropriate definition for the name and determines if the referenced definition has any context limitations or feature variations. If so, it replaces the name with an appropriate t-sel that reflects the context. That context is carried up in the analysis as if the t-sel had been explicitly coded in. What unistd+. h would look like after analysis is shown at 1901 in FIG. 19. The t-sel 1903 has two isel-groups in its sel-factors-expr, one at 1905 and the other at 1906. These are derived from the analysis phase that introduced t-sels 1907 and 1908. When AdI meta-compiler 905 generates ADE headers and libraries from the AdI source file containing the code shown at 1901, the result will be the four different readings for the interface for the pwrite_wchar function shown in the table at 1909. Unlike the previous example, there would be no exclusive iteration, because all cases are covered.

Using Metacompiler 905: FIG. 9

AdI metacompiler 905 reads an AdI system file and a set of AdI source files to produce a set of directories and sources that are then compiled on multiple systems to produce the complete environment. SDE development involves many steps.

1. Compile—All source files are passed to metacompiler 905 compiler at once. This allows it to have the global perspective needed to provide makefiles for the rest of the steps.
2. Verify—Perform the verification step on changed modules (and modules that have been potentially changed by the changes). This is performed by executing:
   make -c gendir vfy
3. Build—Compile, and link the generated components into the gendir/export directory by executing:
   make -c gendir sde
4. Package—Create distribution media for both compile-time and runtime use of the SDE.
5. Install—loading either or both of the compile-time and runtime packages.
6. Use—Place the SDE's bin directory on you path and compile away. Your customers will need the runtime.

The following is an outline of the top-level Gnu make file (gendir/Makefile) generated by the Compile step. It assumes that there are M modules and T target platforms.

```
# Perform all steps
all: vfy impl package
# Perform all steps that you can for any module
.Module1: vfy/.Module1 impl/.Module1
%
.ModuleM: vfy/.ModuleM impl/. ModuleM
# Perform all steps that you can for any target
.Target1: vfy/.Target1 impl/.Target1
. .
.TargetT: vfy/.TargetT impl/.TargetT
# Verify on all targets
vfy: vfy/.Target1 . . vfy/.TargetT
# Verify on particular targets
```

```
vfy/.Target1: vfy/.Module1.Target1 . . vfy/. .ModuleM.Target1
    $ (MAKE ) -c vfy .Target1
. .
vfy/.TargetT: vfy/.Module1.TargetT . . vfy/. .ModuleM.TargetT
    $ (MAKE) -c vfy .TargetT
```

Verify specific modules on specific targets

```
vfy/.Module1.Target1: vfy/Module1.c module-dependencies
    $ (MAKE) -c vfy .Module1.Target1
. .
vfy/.Module1.TargetT: vfy/Module1.c module-dependencies
    $ (MAKE) -c vfy .Module1.TargetT
. .
vfy/.ModuleM.Target1: vfy/ModuleM.c module-dependencies
    $ (MAKE) -c vfy .ModuleM.Target1
. .
vfy/.ModuleM.TargetT: vfy/ModuleM.c module-dependencies
    $ (MAKE) -c vfy .ModuleM.TargetT
```

```
# Build the implementation on all targets
impl: impl/.Target1 . . impl/.TargetT
[This is a duplicate of the vfy section with "impl" replacing "vfy".]

package:
. .
# Clean up
clean:
    rm [lots of stuff]
```

The compiler is invoked as follows:

adic [options] sysfile reference [ targets ] module. . .

Compile one or more AdI source modules. The argument are as follows:

sysfile The pathname of a system file that defines the global parameters for all compilations.

reference The name of a platform defined in a platform-def in the system file that will be used as the reference in this compilation.

targets If present, a comma-separated list (without intervening spaces) of platform names that will be chosen as the targets for this compilation. The reference platform name may appear in the targets list, but there is no obligation that the reference platform be one of the target platforms. If not present, then all platforms defined in the system file are chosen as targets.

module One or more header source modules. Modules are expected to be named with a .m suffix.

The results of compilation are a directory full of source code in the gendir. The file: gendir/Makefile is the top-level file used by the Gnu make utility to complete the process.

Options:

E

Read performing literal and macro substitution and print. Note that if only the sys-file is present, then the -E applies to the sys-file. If not it applies to the other file arguments.

gendir dir

Overrides the default of "gen" as the directory to generate compiler output to. Note that a separate directory is needed for each reference ABI that you wish to support.

i

Attempt to include modules that are referenced in include forms, but not mentioned on the command line. (Mnemonic: I for include.)

l

Compiles any given module only if its source or one of its direct or indirect include or insert dependencies has changed. All modules have an implicit dependency on the sys-file. (Mnemonic: L for lazy)

mfile

Print the passed module names (without the corresponding ".m") to file in a partial ordering with dependees first. (e.g. types typesuser. .)

v

Print (on standard error output) the compiler version number and report progress in the compilation.

In a preferred embodiment, metacompiler 905 runs only on Linux systems. You also need the GNU gcc and GNU make programs for each system that you wish to target.

The compilation process produces the following directories of output that are contained in the gendir directory:

export

The directory that contains everything needed for the generated environment. It contains the following sub-directories:

headers—Contains all header file directories. (Typically just the one called include.)

lib—Contains all the link-time objects (libraries and a few object modules.)

rt—Contains the run-time shared objects that are needed by each target environment. Each object set is contained in a directory whose name is the same as the corresponding target.

Note that there is one link-time shared object for all targets and one run-time object for each target.

impl

A directory of sources for the implementation of the runtime environment for each target. Each library declared in the system file for compilation contains a sub-directory of the same name (with "lib" prefixed to it). Each library subdirectory in turn has two sub-directories called lib and rt which contain the sources for the link-time and run-time objects for the library.

src

A directory of runtime sources [that may move elsewhere]

prove

A directory of files that are compiled and run on each target (in target-specific sub-directories) to prove that the meta-description is consistent with respect to each target. The verification process is controlled by the file prove/Makefile.

The SDE development process requires the following set of commands on each target that it supports on the front of your $PATH. Some have particular restrictions over standard analogs:

on.target command

This command must exist for all defined targets. It sets up the appropriate path environment and performs a command, remotely if necessary.

gcc

Must produce normal (Dwarf) debugging information. It must also recognize the following special options (which if provided will be at the front of the command line before any other options or arguments).

soname See the Linux ld(1) man page.

dynamic See the Linux gcc(1) man page.

dynamic-linker Specifies the path of the ELF interpreter export-dynamic See the Linux ld(1) man page.

rpath See the Linux ld(1) man page.

base-address Specifies the beginning address of the program.

gcc-ld-at address args. .

Must call gcc (and ultimately ld) in a way that loads the program at location address.

ld

The linker program.

/usr/bin/__AdI__perl

This path name as well as the name __AdI__perl on your $PATH must be version 5 of perl. (The funny name reflects the fact that not all OSs agree on the name for the perl version 5 command.)

/AdI__bin/perl

Must point to the above perl.

Report Generation in Metacompiler 905: FIG. 20

In the preferred embodiment, metacompiler 905 can be run in reporting mode. In that mode, report generator 915 creates ADI reports 919. In the preferred environment, reports 919 are HTML pages that present the information in several views that are all reached from the top-level index.html file:

1. An alphabetical view of all identifiers. (Most of the definitions that they are linked to in the example are omitted.)

2. An alphabetical view of all header file names. Each header is planned to expand to a list of links to header files included in the header and links to the definitions that are contained in the header.

3. A table of selectors that is currently not implemented. This table will describe all selector names used in the reporting. The selector names are the atoms of the context which combines them with logical operators.

4. A table of sets of definitions that are different between pairs of platforms. This in an N by N table, where N is the number of platforms that were reported on. The diagonal of the table is blank because there are no differences between a platform and itself. The other cells contain pointers to lists of definitions that are different between platforms.

5. A table of sets of definitions that are "extra" between pairs of platforms.

The links usually lead down to individual identifiers and the definition or definitions that are associated with them. Identifiers are organized into a flat pool of names, rather than a set of names within header files, to accommodate the fact that a definition is often in different places on different platforms. The location differences are often inconsequential to the user because many headers include others.

Once you get to an individual definition, it is presented in one of several forms depending on how it is defined.

A. If the identifier is identically defined in the same header file on all platforms, then it appears as a file name and a definition.

B. If the identifier is identically defined in different headers or is missing from some platforms, then the header names are prefixed with a context that indicates under which conditions the definition appears in a given file.

C. If the identifier has different definitions, then the description expands into a comparison table and a list of sets of context, header, and definition triples.

D. The comparison table contains links that indicate the nature of the difference between pairs of contexts. The only current comparison type is "dlc" which stands for different local components. Future comparison types will include "different referenced components", and "different primitive type".

The report generation tools are currently capable of comparing header file include topology and non-function macro definitions between two platforms with one feature-set view. The design of the browsing facilities, however, accommodates all C and C++ objects, between many platforms with any number of feature-sets.

Other embodiments may employ an interactive browser program in place of a generic HTML viewer. The interactive browser allows the user to interactively create specific views according to platform and feature set and will hide information that the user is not interested in.

FIG. 20 shows an example of a portion of a report 2001. Report 2001 was generated from a comparison of the header files of the Red Hat 6.2 and Suse 6.1 Linux distributions. The report shows all of the definitions that are present in the Suse 6.1 Linux distribution that are not present in the Red Hat 6.2 definitions. At the top of the report is an index 2003; clicking on a letter takes one to the portion of the report that contains terms beginning with the letter. At 2005 are shown the portions of the report for identifiers beginning with "A" and "B" and "C".

FIG. 21 is part of the example report showing simple non-conflicting declarations. At 2101 is a macro that is defined identically in the same place on both systems. At 2102 is a macro that is defined identically in two different locations on the two systems. At 2103 is a macro that is defined identically and is in the same place on both Red Hat 6.2 and Suse 6.1, but also appears at another location on Red Hat 6.2.

FIG. 22 is a part of the example report showing a macro that appears in different forms. At 2201 is a table that indicates that there are two different definitions of the name A_ALTCHARSET and providing links to the actual definitions shown at 2202. The first definition is defined in one place on Suse 6.1, but in four places on Red Hat 6.2. The second definition appears only in Red Hat 6.2.

FIG. 23 is a part of the example report showing a more complicated example where there are three different definitions of a symbol.

Conclusion

The foregoing Detailed Description has disclosed to those skilled in the relevant arts how to make and use an improved program development environment for developing a program that is to execute on a number of platforms and has disclosed the best mode presently known to the inventor of practicing his invention. As will be immediately apparent to those skilled in the relevant arts, there are many ways other than the one disclosed herein of constructing programming environments according to the principles disclosed herein. For example, the particular forms in which programming environments like those described herein are implemented are strongly dependent on other features of the programming environment such as the language used for the source code and the manner in which information needed by the compiler during compilation is provided to the compiler. For instance, the preferred embodiment is intended for use with source code written in the C or C++ languages and compilers for those languages.

Consequently, following the conventions for those languages and compilers, the database that describes the differences in the platform takes the form of a header file. In other embodiments, the database would have the form required for the compilers used in those embodiments. The particular forms of the run-time test library, the compatibility run-time library, and the platform proof source code are also strongly dependent on the language, compiler, and conventions of a given programming environment.

Similarly, the form of the AdI language used in the preferred embodiment includes fragments from the C language. In other embodiments, it would include fragments from the language used in those embodiments. Moreover, the form in which selectors are implemented in the AdI language is only one of many possible forms, and the form of the tree selector used in the meta-compiler is only one of many possible forms.

For all of the foregoing reasons, the detailed description is to be regarded as being in all respects exemplary and not restrictive, and the breadth of the invention disclosed here in is to be determined not from the detailed description, but rather from the claims as interpreted with the full breadth permitted by the patent laws. t,v,1-47/2

What is claimed is:

1. An improved program development environment in which a program which is to execute on a plurality of different platforms can be developed, the program development environment including a processor that has access to a data storage device and a compiler that executes on the processor and produces object code from source code for the program, the improvement comprising:

information stored on the data storage device that describes differences between the platforms and is interpretable by the compiler and platform proof source code stored on the data storage device, the platform proof source code corresponding to at lease a given one of the platforms, the compiler responding to the source code and the information by indicating whether any of the source code is incompatible with any of the differences described in the information and to the platform proof source code for the given platform to produce binary that is executed on the given platform to determine whether the information correctly describes differences for the given platform.

2. The improved program development environment set forth in claim 1 wherein the improvement further comprises:

a description of the differences between the platforms that is stored in the data storage device; and a metacompiler that executes on the processor and compiles the description to produce the information and the platform proof source code.

3. Instrumentation for a compilation environment that runs on a processor that has access to a data storage device, the instrumentation detecting elements of source code for a program which is compiled in the instrumented compilation environment that do not conform to one or more of a set of platforms upon which the program is to be executed, the instrumentation comprising:

information stored in the data storage device that describes differences between the platforms belonging to the set thereof and platform proof source code for a given platform, the platform proof source code being stored in the data storage device, the compilation environment responding to the source code and the information by indicating nonconforming elements for each platform in the set and to the platform proof source code by producing binary that is executed on the given platform to determine whether the information is correct with regard to the given platform.

* * * * *